(12) United States Patent
Humblet

(10) Patent No.: US 8,520,659 B2
(45) Date of Patent: Aug. 27, 2013

(54) ABSOLUTE TIME RECOVERY

(75) Inventor: Pierre A. Humblet, Cambridge, MA (US)

(73) Assignee: Airvana LLC, Chelmsford, MA (US)

( * ) Notice: Subject to any disclaimer, the term of this patent is extended or adjusted under 35 U.S.C. 154(b) by 1130 days.

(21) Appl. No.: 11/958,975

(22) Filed: Dec. 18, 2007

(65) Prior Publication Data

US 2009/0154447 A1    Jun. 18, 2009

(51) Int. Cl.
  *H04J 3/06* (2006.01)
(52) U.S. Cl.
  USPC .......................................... 370/350; 370/324
(58) Field of Classification Search
  None
  See application file for complete search history.

(56) References Cited

U.S. PATENT DOCUMENTS

| | | | |
|---|---|---|---|
| 4,677,617 A | | 6/1987 | O'Connor et al. |
| 5,172,396 A | * | 12/1992 | Rose et al. ..................... 375/356 |
| 5,363,110 A | * | 11/1994 | Inamiya ..................... 342/357.31 |
| 5,736,964 A | * | 4/1998 | Ghosh et al. ..................... 342/457 |
| 5,812,749 A | | 9/1998 | Fernandez et al. |
| 5,898,929 A | * | 4/1999 | Haartsen ..................... 455/462 |
| 6,369,751 B1 | * | 4/2002 | Naruse ..................... 342/357.42 |
| 6,433,739 B1 | * | 8/2002 | Soliman ..................... 342/387 |
| 6,438,702 B1 | | 8/2002 | Hodge |
| 6,477,154 B1 | * | 11/2002 | Cheong et al. ..................... 370/328 |
| 6,549,559 B2 | * | 4/2003 | Kamgar et al. ..................... 375/134 |
| 6,581,110 B1 | | 6/2003 | Harif et al. |
| 6,711,144 B1 | | 3/2004 | Kim et al. |
| 6,731,618 B1 | | 5/2004 | Chung et al. |
| 6,741,862 B2 | | 5/2004 | Chung et al. |
| 6,781,999 B2 | | 8/2004 | Eyuboglu et al. |
| 6,813,478 B2 | * | 11/2004 | Glazko et al. ............... 455/67.14 |
| 7,009,948 B1 | | 3/2006 | Carlsson et al. |
| 7,170,871 B2 | | 1/2007 | Eyuboglu et al. |
| 7,200,391 B2 | | 4/2007 | Chung et al. |
| 7,242,958 B2 | | 7/2007 | Chung et al. |
| 7,277,446 B1 | | 10/2007 | Abi-Nassif et al. |
| 7,299,278 B2 | | 11/2007 | Ch'ng |
| 7,301,987 B2 | * | 11/2007 | Edlis et al. ..................... 375/140 |
| 7,558,356 B2 | | 7/2009 | Pollman et al. |
| 7,558,588 B2 | | 7/2009 | To et al. |
| 8,138,945 B2 | | 3/2012 | Hayakawa et al. |
| 2001/0010505 A1 | * | 8/2001 | Naruse ..................... 342/357.12 |
| 2001/0026547 A1 | | 10/2001 | Moulsley et al. |
| 2001/0046872 A1 | | 11/2001 | Masuda |

(Continued)

FOREIGN PATENT DOCUMENTS

GB    2452688    3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Bunjob Jaroenchonwanit
(74) *Attorney, Agent, or Firm* — Fish & Richardson P.C.

(57) ABSTRACT

A method includes receiving from a server, information that is based on an offset between a boundary of a synchronous capsule in a control channel cycle occurring at an access point and a boundary of a periodic pseudo-noise sequence, and synchronizing an access point to an absolute time based on the information. In addition, the method includes transmitting to the server a difference between a first boundary of a PN short code of a current sector and a second boundary of a PN short code of a reference sector.

57 Claims, 5 Drawing Sheets

(56) References Cited

U.S. PATENT DOCUMENTS

Figure 1:
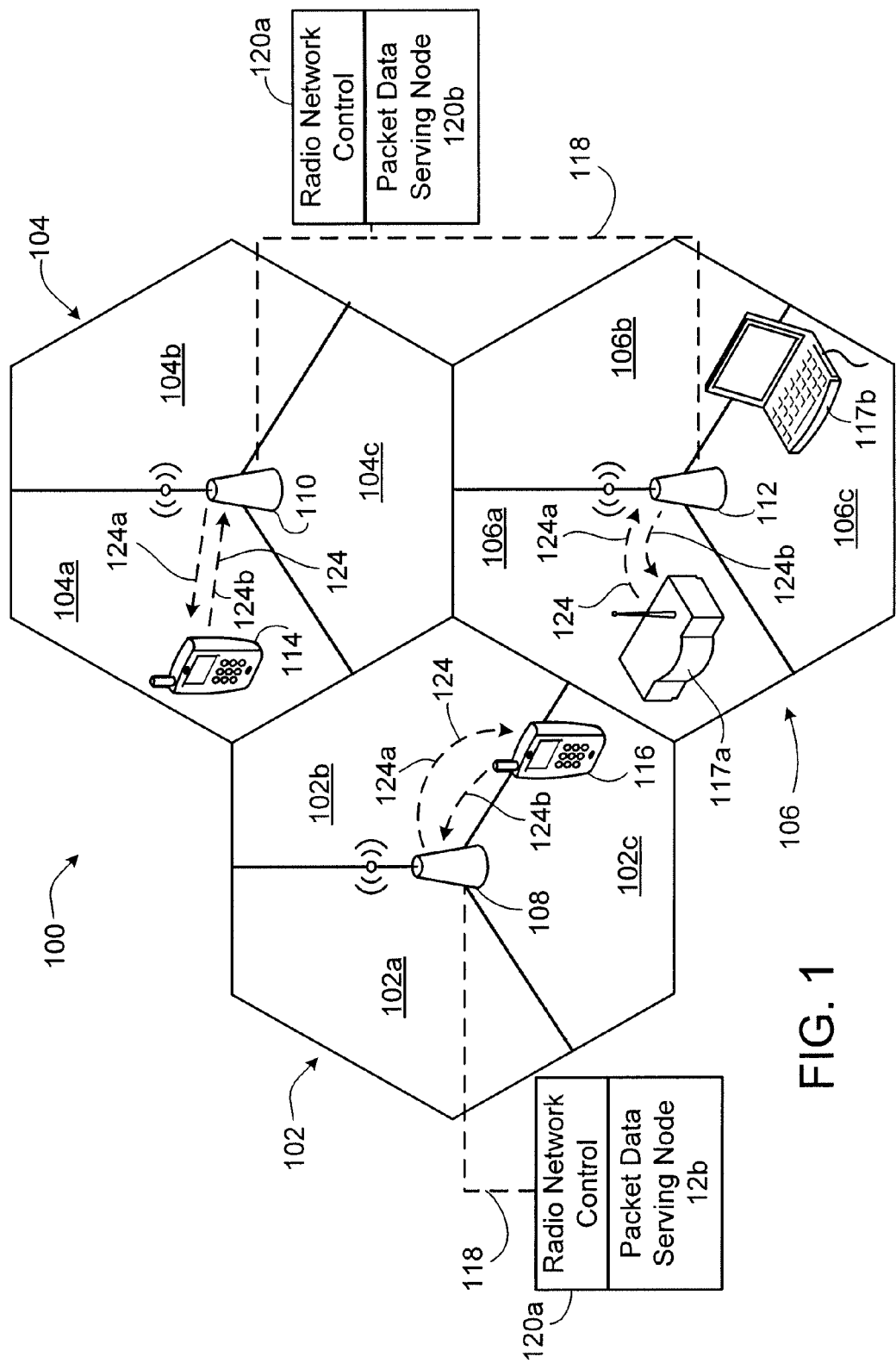

| | | | |
|---|---|---|---|
| 2002/0014990 A1* | 2/2002 | Kimura | 342/458 |
| 2002/0072853 A1* | 6/2002 | Sullivan | 701/213 |
| 2002/0110151 A1* | 8/2002 | Dickey | 370/503 |
| 2002/0129291 A1 | 9/2002 | Gonzalez | |
| 2002/0196749 A1 | 12/2002 | Eyuboglu et al. | |
| 2003/0012174 A1* | 1/2003 | Bender et al. | 370/347 |
| 2003/0016702 A1* | 1/2003 | Bender et al. | 370/522 |
| 2003/0026240 A1* | 2/2003 | Eyuboglu et al. | 370/349 |
| 2003/0040869 A1* | 2/2003 | Nir et al. | 701/214 |
| 2003/0084190 A1 | 5/2003 | Kimball | |
| 2003/0100311 A1 | 5/2003 | Chung et al. | |
| 2003/0103475 A1* | 6/2003 | Heppe et al. | 370/321 |
| 2004/0029591 A1 | 2/2004 | Chapman et al. | |
| 2004/0042576 A1* | 3/2004 | Anderson | 375/365 |
| 2004/0085938 A1* | 5/2004 | Tiedemann et al. | 370/335 |
| 2004/0098506 A1 | 5/2004 | Jean | |
| 2004/0120386 A1* | 6/2004 | Grilli et al. | 375/148 |
| 2004/0125822 A1 | 7/2004 | Jun et al. | |
| 2004/0131032 A1* | 7/2004 | Sendonaris et al. | 370/335 |
| 2004/0203853 A1* | 10/2004 | Sheynblat | 455/456.1 |
| 2004/0249949 A1 | 12/2004 | Gourraud et al. | |
| 2005/0043046 A1* | 2/2005 | Lee | 455/502 |
| 2005/0048969 A1 | 3/2005 | Shaheen et al. | |
| 2005/0053047 A1* | 3/2005 | Osterloh et al. | 370/344 |
| 2005/0063358 A1 | 3/2005 | Houghton et al. | |
| 2005/0078032 A1 | 4/2005 | Gilkes | |
| 2005/0135194 A1* | 6/2005 | Ishii | 368/47 |
| 2005/0138531 A1* | 6/2005 | Kim | 714/774 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0281231 A1* | 12/2005 | Kwon et al. | 370/335 |
| 2006/0046762 A1* | 3/2006 | Yoon et al. | 455/519 |
| 2006/0067422 A1 | 3/2006 | Chung | |
| 2006/0067451 A1 | 3/2006 | Pollman et al. | |
| 2006/0125685 A1 | 6/2006 | Jeon et al. | |
| 2006/0126509 A1 | 6/2006 | Abi-Nassif | |
| 2006/0159045 A1 | 7/2006 | Ananthaiyer et al. | |
| 2006/0219087 A1 | 10/2006 | Yanase et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0133501 A1* | 6/2007 | Park | 370/350 |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0159321 A1 | 7/2007 | Ogata et al. | |
| 2007/0206838 A1* | 9/2007 | Fouquet | 382/115 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2007/0280098 A1 | 12/2007 | Bhatt et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1* | 7/2008 | Ch'ng et al. | 370/335 |
| 2008/0162924 A1 | 7/2008 | Chinitz et al. | |
| 2008/0162926 A1 | 7/2008 | Xiong et al. | |
| 2008/0183525 A1 | 7/2008 | Tsuji et al. | |
| 2008/0212518 A1 | 9/2008 | Wells | |
| 2008/0253550 A1* | 10/2008 | Ch'ng et al. | 379/207.13 |
| 2008/0254792 A1 | 10/2008 | Ch'ng | |
| 2008/0304604 A1 | 12/2008 | Oh | |
| 2008/0318557 A1 | 12/2008 | Poulson et al. | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0161638 A1 | 6/2009 | Mullen | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'ng et al. | |
| 2009/0170520 A1 | 7/2009 | Jones | |
| 2009/0170547 A1 | 7/2009 | Raghothaman et al. | |
| 2009/0172169 A1 | 7/2009 | Ch'Ng et al. | |
| 2009/0172397 A1 | 7/2009 | Kim | |
| 2010/0066601 A1 | 3/2010 | Abraham et al. | |
| 2010/0069035 A1 | 3/2010 | Johnson | |
| 2010/0074180 A1* | 3/2010 | Palanki et al. | 370/328 |
| 2010/0226214 A1* | 9/2010 | Irie et al. | 368/47 |
| 2011/0110360 A1 | 5/2011 | Fenwick et al. | |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

Wu, Qiang et al., "cdma2000 Highly Detectable Pilot", 2008 IEEE, pp. 16-20.

Office action from U.S. Appl. No. 12/343,850, mailed Apr. 25, 2012 (21 pages).

Fish & Richardson, P.C., Response to Non Final Office Action mailed Apr. 25, 2012 in U.S. Appl. No. 12/343,850, filed Aug. 26, 2012 (13 pages).

* cited by examiner

ABSOLUTE TIME RECOVERY

BACKGROUND

This description relates to absolute time recovery in wireless networks.

Cellular wireless communications systems are designed to serve many access terminals distributed in a large geographic area by dividing the area into cells, as shown in FIG. 1. At or near the center of each cell 102, 104, 106 (generally 102), a radio network access point, also referred to as a macro base transceiver station 108, 110, 112 (generally 108), is located to serve access terminals 114, 116 (generally 114) (e.g., cellular telephones, laptops, PDAs). Each cell 102 is often further divided into sectors 102a-c, 104a-c, 106a-c (generally 102a) by using multiple sectorized antennas. A base transceiver station 108 corresponding to a cell 102 serves one or more sectors 102a and communicates with multiple access terminals 114 within the cell 102.

Occasionally, macro signals in the environments of the access terminals 114, which normally provide timing information, are weak. For this reason, it is difficult to decode, for example, sync messages, included in the macro signals. Accordingly, it is desirable to recover absolute time from the timing pattern of weak macro signals provided by a local base transceiver station 108.

The 1x EV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication protocols can also be used.

SUMMARY

In general, in one aspect, a method includes receiving from a server, information that is based on an offset between a boundary of a synchronous capsule in a control channel cycle occurring at an access point and a boundary of a periodic pseudo-noise sequence, and synchronizing an access point to an absolute time based on the information.

The following are embodiments within the scope of this aspect.

The information comprises at least one of a UTC time at a beginning of the control channel cycle and a synchronous capsule offset. The method also includes synchronizing the access point to the periodic pseudo-noise sequence. The beginning the periodic pseudo-noise sequence immediately precedes the boundary of the synchronous capsule. The method also includes transmitting, to the server, a carrier frequency corresponding to each macro signal acquired by the access point.

The method also includes transmitting to the server a difference between a first boundary of a PN short code of a current sector and a second boundary of a PN short code of a reference sector. In addition, the method includes transmitting to the server a first carrier frequency corresponding to a current sector and a second carrier frequency corresponding to a reference sector. The control channel cycle is a current control channel cycle.

The server is configured to store location information for each access point. The location information comprises at least one of a street address, a zip code, a latitude and a longitude. The method of claim 1 also includes identifying the boundary of the synchronous capsule by detecting a preamble of the synchronous capsule.

In another aspect, a method includes receiving a UTC time corresponding to a beginning of a control channel cycle, and synchronizing an access point to the UTC time, if at least a predetermined number of sectors, each having a unique synchronous capsule offset, is acquired by the access point. In an embodiments within the scope of this aspect, the predetermined number of sectors acquired by the access point is at least two. In some examples, receiving a UTC time corresponding to the beginning of the control channel cycle is in response to the detection of a boundary of a synchronous capsule.

In another aspect, a method includes synchronizing an access point to a periodic pseudo-noise sequence in a macro signal, and establishing absolute time synchronization based on at least a boundary of a synchronous capsule in a control channel cycle occurring at the access point and a beginning of the periodic pseudo-noise sequence that immediately precedes the boundary of the synchronous capsule.

In some embodiments within the scope of this aspect, establishing absolute time synchronization includes receiving information from a server based on an offset between the boundary of the synchronous capsule in the control channel cycle occurring at the access point and the beginning of the periodic pseudo-noise sequence, and establishing absolute time synchronization based on the information. In some examples, synchronizing the access point to the periodic pseudo-noise sequence comprises detecting a pilot signal burst in at least one frame of the current control channel cycle.

In another aspect, a method includes receiving a difference between a first boundary of a first PN short code corresponding to a current sector and a second boundary of a second PN short code corresponding to a reference sector, determining information corresponding to the current sector based on the difference, and transmitting the information corresponding to the current sector to an access point.

The following are embodiments within the scope of this aspect.

The method also includes receiving carrier frequencies of a plurality of macro signals acquired by the access point. The information is at least one of a slot offset between a boundary of a frame and a boundary of a synchronous capsule and a UTC time of the synchronous capsule for the current sector. In some examples, the information is at least one of a slot offset between a boundary of a frame and a boundary of a synchronous capsule and a UTC time at a beginning of a periodic pseudo-noise sequence for the reference sector. Determining information corresponding to the current sector is also based on location information of each access point. The location information is at least one of a street address, a zip code, a latitude and a longitude.

In another aspect, an apparatus includes an access point configured to receive information that is based on an offset between a boundary of a synchronous capsule in a current control channel cycle occurring at the access point and a beginning of a periodic pseudo-noise sequence, and synchronize the access point to an absolute time based on the information.

The following are embodiments within the scope of this aspect.

The information includes at least one of a UTC time at a beginning of the control channel cycle and a synchronous capsule offset. The access point is configured to also synchronize the access point to the periodic pseudo-noise sequence.

The beginning the periodic pseudo-noise sequence immediately precedes the boundary of the synchronous capsule. The access point is configured to also transmit, to a server, a carrier frequency corresponding to each macro signal acquired by the access point. The access point is configured to also transmit, to a server, a difference between a first boundary of a PN short code of a current sector and a second boundary of a PN short code of a reference sector.

The control channel cycle is a current control channel cycle. The server is configured to store location information for each access point. The location information includes at least one of a street address, a zip code, a latitude and a longitude. The access point is also configured to identify the boundary of the synchronous capsule by detecting a preamble of the synchronous capsule.

In another aspect, an apparatus includes a server configured to receive a difference between a first boundary of a first PN short code corresponding to a current sector and a second boundary of a second PN short code corresponding to a reference sector, determine information corresponding to the current sector based on the difference, and transmit the information corresponding to the current sector to an access point.

The following are embodiments within the scope of this aspect.

The server is configured to also receive a carrier frequency corresponding to each macro signal acquired by the access point. The information is at least one of a slot offset between a boundary of a frame and a boundary of a synchronous capsule, and a UTC time of the synchronous capsule for the current sector. In some examples, the information is at least one of a slot offset between a boundary of a frame and a boundary of a synchronous capsule, and a UTC time at a beginning of a periodic pseudo-noise sequence for the reference sector. The server is configured to determine information corresponding to the current sector is also based on location information of each access point. The location information is at least one of a street address, a zip code, a latitude and a longitude.

In another aspect, a computer readable medium comprising instructions to cause an access point to receive information that is based on an offset between a boundary of a synchronous capsule in a current control channel cycle occurring at the access point and a beginning of a periodic pseudo-noise sequence, and determine an absolute start time of the current control channel cycle based on the absolute time signal.

The following are embodiments within the scope of this aspect.

The medium includes instructions to cause the access point to synchronize to the periodic pseudo-noise sequence. The beginning the periodic pseudo-noise sequence immediately precedes the boundary of the synchronous capsule. The medium includes instructions to cause the access point to also transmit, to a server, a carrier frequency corresponding to each macro signal acquired by the access point. The medium includes instructions to cause the access point to also transmit, to a server, a difference between a first boundary of a PN short code of a current sector and a second boundary of a PN short code of a reference sector.

The control channel cycle is a current control channel cycle. The location information comprises at least one of a street address, a zip code, a latitude and a longitude. The information comprises at least one of a UTC time at a beginning of the control channel cycle and a synchronous capsule offset. The medium includes instructions to cause the access point to identify the boundary of the synchronous capsule by detecting a preamble of the synchronous capsule.

In another aspect, a computer readable medium includes instructions to cause a server to receive a difference between a first boundary of a first PN short code corresponding to a current sector and a second boundary of a second PN short code corresponding to a reference sector, determine information corresponding to the current sector based on the difference, and transmit the information corresponding to the current sector to an access point.

The following are embodiments within the scope of this aspect.

The medium also includes instructions to cause a server to also receive a carrier frequency corresponding to each macro signal acquired by the access point. The information is at least one of a slot offset between a boundary of a frame and a boundary of a synchronous capsule, and a UTC time of the synchronous capsule for the current sector. In some examples, the information is at least one of a slot offset between a boundary of a frame and a boundary of a synchronous capsule, and a UTC time at a beginning of a periodic pseudo-noise sequence for the reference sector.

The medium includes instructions to also cause the server to determine information corresponding to the current sector based also on location information of each access point. The location information is at least one of a street address, a zip code, a latitude and a longitude.

In another aspect, a method includes receiving from a server, information that is based on an offset between a first timing boundary and a second timing boundary, and synchronizing an access point to an absolute time based on the information.

In embodiments within the scope of this aspect, the first timing boundary is a boundary of at least one of a frame, a periodic pseudo-noise sequence, a control channel cycle and a synchronous capsule occurring in a macro signal. Also, in some examples, the first timing boundary is in a first macro signal and the second timing boundary is in a second macro signal.

Other aspects and features and combinations of them can be expressed as methods, apparatus, systems, program products, means for performing functions, and in other ways. Other advantages and features will become apparent from the following description and claims.

DESCRIPTION

Figure 2:
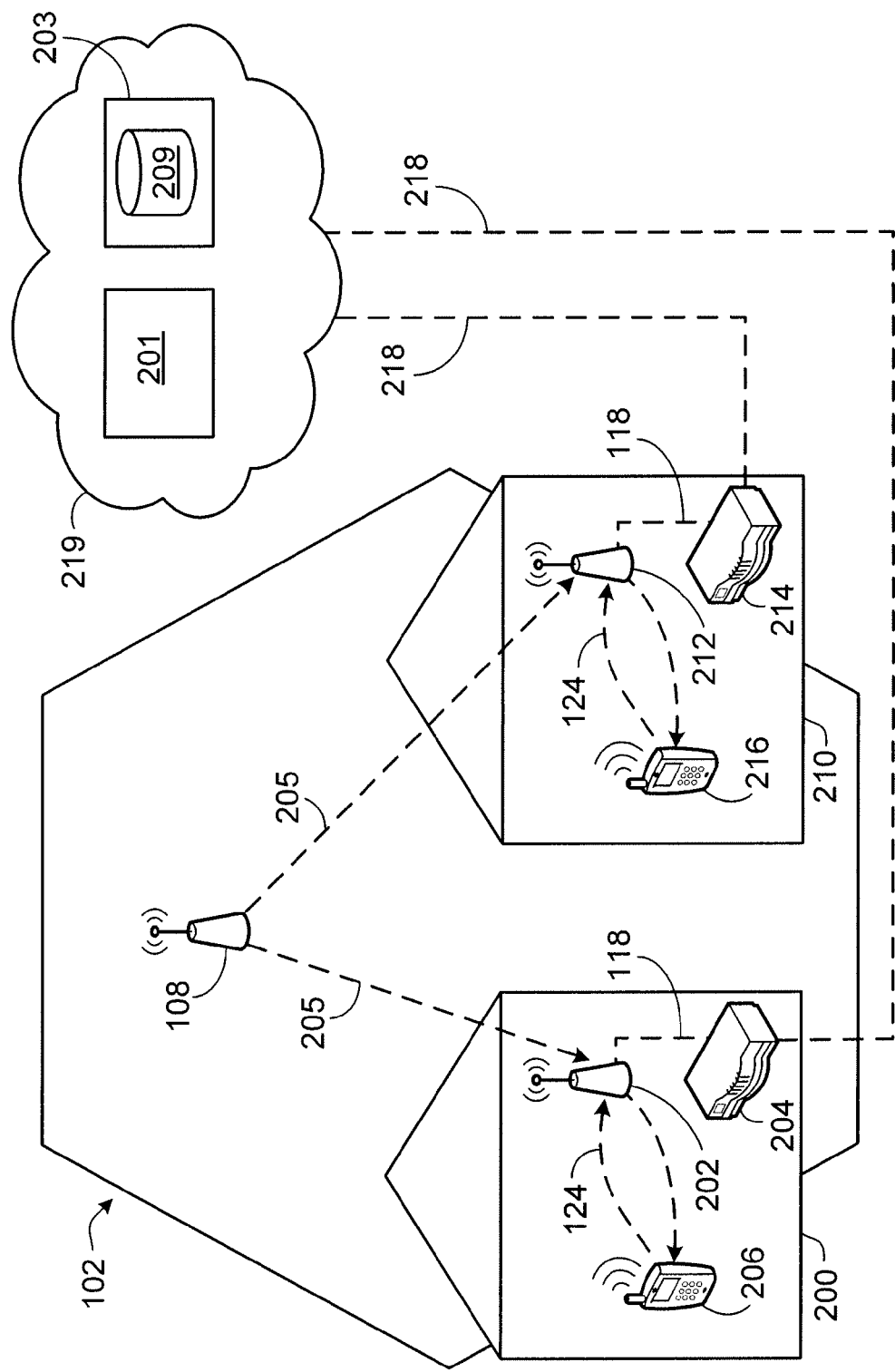
Figure 3:
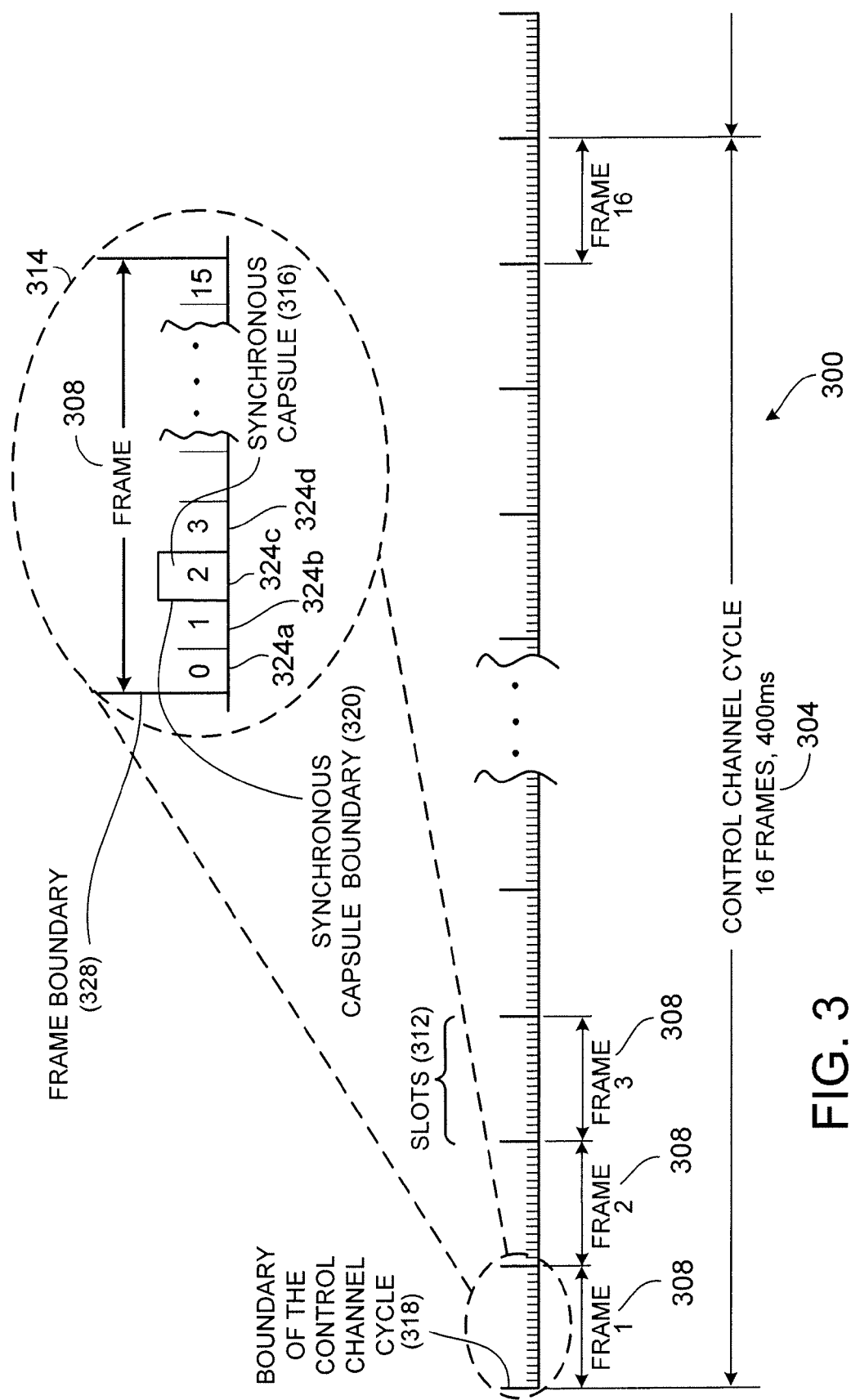
Figure 4:
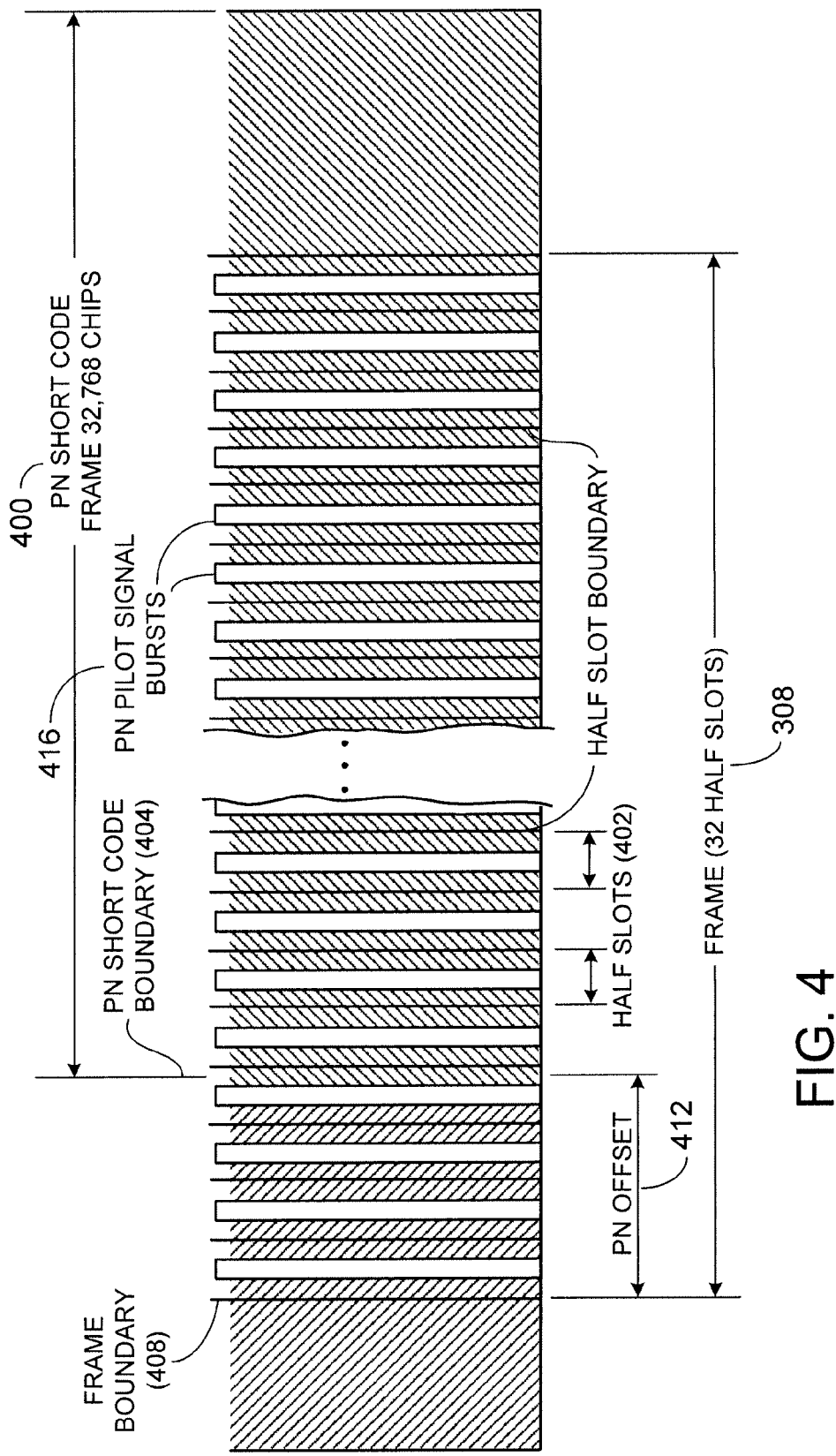
Figure 5:
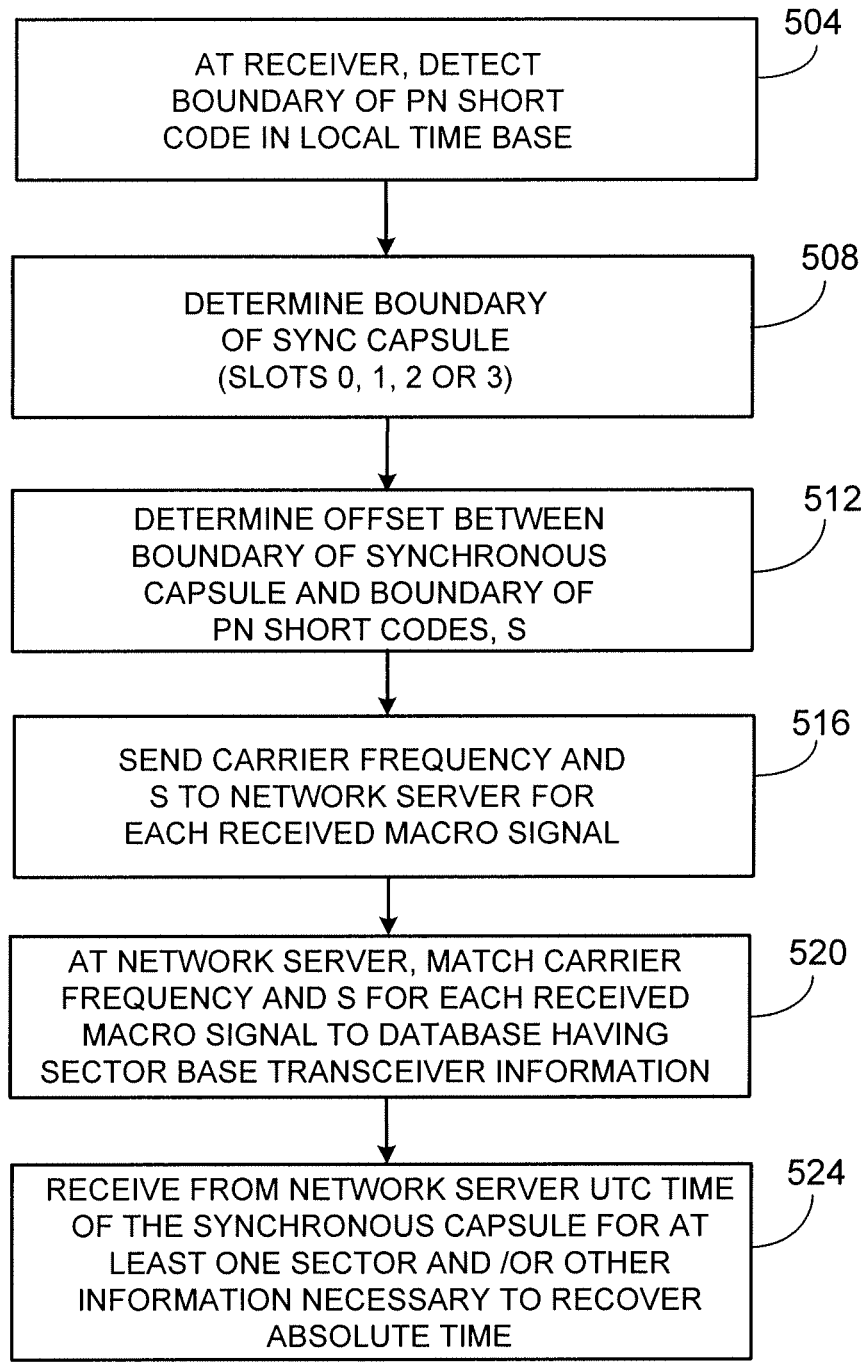

FIG. 1 is a block diagram of a network.
FIG. 2 is a block diagram of an access point deployment.
FIGS. 3 and 4 are timing diagrams.
FIG. 5 is a flowchart.

Referring to FIG. 1, a radio access network (RAN) 100 uses the 1x EV-DO protocol to transmit data packets between an access terminal, e.g., access terminal 114 and 116 (generally 114), and a macro base transceiver station, e.g., base transceiver stations 108, 110, 112 (generally 108). The base transceiver stations 108 are connected over a backhaul connection 118 to radio network controller/packet data serving nodes (RNC/PDSN) 120a-b, which are typically one or more physical devices at different locations. Although this description uses terminology from Ev-DO standards, the same concepts are applicable to other communication methods, including 1xRTT, GSM, UMTS, HSDPA, WiMax, WiBro or WiFi.

The access terminals 114 are typically single-user devices, such as a cellular telephones and PDAs, or multiple-user devices, such as routers 117a that allow single-user devices, such as laptops 117b, to connect to the access terminals 114 through local links (not shown). In some examples, the local links can be wired connections, e.g., Ethernet on a wired LAN, or wireless, e.g., Wi-Fi connections to a wireless LAN.

In some examples, the functions of the base transceiver station 108 and the radio network controller (RNC) 120a are combined into a single device. In addition, the functions of the PDSN 120b and the radio network control (RNC) 120a are typically combined into a single device. In some implementations, functions of the base transceiver station 108, the RNC 120a and the PDSN 120b are additionally combined into the same device.

The implementations in this disclosure are independent of the above combinations and the benefits apply to all combinations. References in this description to a radio access network (RAN) 100 taking action or being acted upon generally refer to a radio network control (RNC) 120a or a radio network control (RNC) 120a in combination with other devices.

Each access terminal 114 is in communication with a base transceiver station 108 through an air link 124. The air link 124 includes a forward link 124a (also referred to as a downlink), which carries data from a base transceiver station 108 to an access terminal 114, and a reverse link 124b (also referred to as an uplink), which carries data from the access terminal 114 to the base transceiver station 108.

In some examples, as shown in FIG. 2, an access point, e.g. access point 202 or 212 (generally 202) (sometimes referred to as a "femto" or a "private access point") is deployed, for example, in a user's home, e.g., 200, 210 (generally 200), in a manner similar to a WiFi® access point. In some examples, the access point 202 is configured in a manner similar to a base transceiver station 108. Accordingly, the access point 202 includes both a transmitter and a receiver configured to receive signals at different sub-bands. The access point 202 can also be installed, for example, in an office, a public space, or a restaurant. The references in this description to an access point 202 being in a "home" also include such locations.

Typically, an access point 202 uses an available high-speed internet connection, such as a connection over a DSL modem 204 or a cable modem 214, for connection to the backhaul 118. In some examples, the access points 202 are in communication with a network 219, e.g., a remote network or the Internet. Generally, the access points 202 communicate with the network 219 through a backhaul connection 218, e.g., a digital subscriber line (DSL) or a cable connection. As shown, the network 219 includes one or more remote network servers, e.g., servers 201 and 203. In some implementations, a network server database, e.g., database 209, described in further detail below, is included within at least one of the network servers, e.g., server 203. In some implementations, the database 209 is included within the same server 201 as a time server. In some implementations, the network server database 209 includes the time server (not shown).

When an authorized access terminal, e.g., access terminals 206, 216 is inside a home (or anywhere within range of the access point 202), it uses the access point 202 rather than the macro base transceiver station 108 to place or receive voice calls and establish data connections. In some examples, the access point 202 is integrated into or connected to the cable modem 204, a WiFi access point (not shown), or other network hardware (such as the router 117a in FIG. 1). Some details and examples are discussed in co-pending applications Ser. No. 11/640,501, titled Provisioning Private Access Points for Wireless Networking, and Ser. No. 11/640,503, titled Configuring Preferred User Zone Lists for Private Access Points for Wireless Networking, both filed Dec. 15, 2006, both incorporated here by reference.

In general, the 1xEv-DO protocol provides for digital messages, i.e., messages transmitted over the air link 124, to be communicated to and from one or more access terminals 114, and macro base transceiver stations 108 in the radio access network 100. The messages transmitted over the air link 124 are typically provided to, for example, report statuses of the access terminals 114, send requests to the macro base transceiver stations 108, adjust configurations of the access terminals 114, and transmit user data.

Typically, the access points 202, 212 are configured to receive radio signals 205 from the macro base transceiver station 108. Accordingly, in some examples, the access points 202 and 212 do not transmit signals to the macro base transceiver station 108 but listen to the radio signals 205 transmitted by the macro base transceiver station 108.

The digital messages from the macro base transceiver stations 108 are communicated as "chips," which form the basic signal elements in a CDMA waveform. In some examples, the 1xEv-DO protocol provides for the transmission of up to 1.2288 million chips per second.

As shown in FIG. 3, a macro signal 300 transmitted over the air link 124 is organized as macro signal frames 308. The macro signal frames 308 are aligned in the same manner for all the sectors 102a in one or more cells 102.

Referring briefly to FIG. 4, in general, the 1xEV-DO protocol provides that the macro signal frame 308 includes 32 half-slots 402 having 1,024 chips each, so that the duration of a macro signal frame 308 is 32,768 chips. In addition, the 1x EV-DO protocol provides for a pilot signal based on a short complex pseudo-noise (PN) code or sequence ("PN short code") 400 that repeats every 32,768 chips but that is only transmitted in the 96 central chips, i.e., chips 464 to 559, of each half slot.

A boundary 404 of the PN short code 400 is offset from a boundary 408 of the macro signal frame 308 by a PN offset 412. In some examples, the PN offset 412 is substantially unique for each sector 102a in the local environment of the access point 202, at a given carrier frequency. The 1xEv-DO protocol provides for 512 PN offsets, often described as PN offset indices 0 to 511. Accordingly, the PN offset indices are separated from each other by 64 chips.

Referring again to FIG. 3, each of the macro signals 300 includes a series of control channel cycles, i.e., multiple occurrences of control channel cycle 304. The control channel cycle 304 in the macro signal 300 from the macro base transceiver station 108 includes a sequence of 16 macro signal frames 308, each having a predetermined number of slots 312. Accordingly, the control channel cycle 304 occurs every 16 frames or about 400 ms. The control channel cycles 304 are aligned in the same manner for all the sectors 102a in one or more cells 102.

As shown in an enlarged view 314 of the frame 308, the macro base transceiver station 108 sends a synchronous capsule 316 of a predetermined length, within 0-3 slots offset from the start 318 of each control channel cycle 304. In some examples, the synchronous capsule 316 is spread over non-contiguous slots that are spaced apart from each other by a predetermined number of slots, e.g., 4 slots. In the enlarged view 314, only a first slot of the synchronous capsule 316 is shown. The synchronous capsule 316 typically includes control information transmitted at 38.4 or 76.8 kb/s, scrambled with the PN short code 400.

The boundary 320 of the synchronous capsule 316 is at the beginning of one of the first four slots 324a-d (slots 0, 1, 2 and 3) immediately following the boundary 328 of the first macro signal frame 308 in the control channel cycle 304. In some examples, the location of the boundary 320 of the synchronous capsule 316 depends on the sector 102a.

The 1x Ev-DO protocol provides that the position of the boundary 320 of the synchronous capsule 316 is indicated by a data chip sequence or a preamble comprising 1,024 (for a chip rate of 38.4 kb/s) or 512 (for a chip rate 76.8 kb/s) chips. Accordingly, the preamble is a 64-chip signed Walsh cover corresponding to specialized indices, e.g., Medium Access Control (MAC) indices 2 or 3. In some examples, the Walsh covers are [+1 −1 +1 −1 . . . ] and [−1 +1 −1 +1 . . . ] sequences.

Since there are 800 available data chips in each half-slot 402, the preamble of the synchronous capsule 316 extends over a predetermined portion belonging to one or two half-slots 402. In general, references to timing boundaries in this description refer to one or more boundaries in the macro signal 300, such as, for example, boundaries of half-slots 402, frames 308, synchronous capsules 316 and control channel cycles 304.

Absolute time is generally determined relative to a standard. For example, the 1x EV-DO provides a CDMA system time of Jan. 6, 1980 00:00:00 UTC (Coordinated Universal Time, also the beginning of GPS time) as the start time of a control channel cycle 304 that is substantially the same across one or more sectors 102a in one or more cells 102.

The 1x EV-DO protocol provides that the base transceiver station 108 transmits a synchronization macro signal, e.g., a sync message, in at least every three synchronous capsules. The sync message contains an indication of the current time expressed in number of macro signal frames 308 since the time origin as well as a value of a PN offset 412. In some examples, the access point 202 is configured to decode the sync message.

The process of synchronizing an access point 202 typically has two aspects. In a first aspect known as frequency synchronization, the chip rate used by the access point 202 matches the chip rate used in the macro signal 300. In some examples, this is accomplished by processing a pilot portion, i.e., the pilot signal based the short PN code 400, of the macro signal 300.

In a second aspect, known as absolute time synchronization, the access point 202 associates an absolute time of transmission with each chip it receives. In some examples, this is accomplished by associating a UTC time received in a message with an identifiable chip, such as, for example, the start 318 of the control channel cycle 318 or the boundary 328 of the frame 308.

The access point 202 determines the location of the boundary 404 of the PN short code 400 in the macro signal 300. Various methods for synchronizing the access point 202 to pilot using the PN short code 400, and determining the position of the boundary 404 of the PN short code 400 and the position of the half slot boundaries are known to persons skilled in the art.

The access point 202 determines the location of the boundary 404 of the PN short code 400 by correlating the pilot portion of the macro signal 300 that is received (oversampled at a multiple X of the chip rate, e.g., X=1 or 2 times the chip rate) with delayed copies of a PN short code generated by the access point 202 and locating a region of significant peaks (for example, a region of width, W).

In some situations, an initial clock frequency of the access point 202 does not match that used by the macro base transceiver station 108. As a result, it is not possible to correlate coherently over long periods of time. If the relative frequency error does not exceed $10^{-6}$, which can be achieved by temperature compensated crystal oscillators, coherent correlation is possible over 96 pilot chips in a half slot. As the frequency error decreases, coherent correlation can be effected on groups of several consecutive half slots. Correlation across these groups can be done by using non coherent accumulation, or by performing coherent modulation with a set of hypothesized frequency errors.

The access point 202 obtains a power profile of a channel response over a window region W while correlating the macro signal 300 that is received from the macro base transceiver station 108 to the delayed copies of the PN short code 400. The power profile is obtained in a manner similar to a moving average. However, if time drift compensation is not implemented, the frequency error also contributes to a non-coherent accumulation of an energy profile during the correlation process because a $10^{-6}$ error translates into a 1.25 chip offset per second. The maximum accumulation time is of the order of 800/X ms in order to achieve accurate channel delay power profile.

In some examples, the access point 202 acquires the macro signals 300 of all base transceiver stations 108 within range of the access point 202. The access point 202 then detects the pilot signal of the PN short code 400 corresponding to the strongest macro signal 300 from a macro base transceiver station 108. Subsequently, the access point 202 begins to look for the second strongest macro signal (not shown), possibly after canceling the strongest macro signal 300.

As shown in FIG. 5, the access point 202 uses the correlation process described above to determine the boundary 404 or the beginning of the PN short code 400 in a time base that is local to the access point 202. (Step 504) The macro signal frame 308 typically begins at a half-slot boundary 420. Accordingly, there are 32 possible positions for the boundary 408 of the macro signal frame 308. (PN offset modulo 1,024 chips=32 possibilities)

Subsequently, the access point 202 determines the boundary 320 of the synchronous capsule 316 by detecting a predetermined chip sequence. (Step 508) In some examples, the access point 202 processes at least a predetermined number, e.g., 512, of simultaneous chips corresponding to the length of the preamble of the synchronous capsule 316 to determine the location of the boundary 320 of the synchronous capsule 316.

In some examples, the access point 202 determines the location of the boundary 320 of the synchronous capsule 316 by known processing techniques, such as rake filtering, PN despreading and multiplying an in-phase component (PNI component) of the PN short code 400 by the [+1 −1 +1 −1 . . . ] or [−1 +1 −1 +1 . . . ] sequence and accumulating over a predetermined number, e.g., 512, of chips. The accumulation can be effected over many successive synchronous capsules.

If the macro signal 300 is strong enough, the access point 202 decodes the synchronous capsule 316, and eventually the sync message, which contain enough information to obtain the UTC time at the macro base transceiver station 108 at the start of the current access cycle 304. With this information, the absolute time of all subsequent chips and macro signal frames 308 can be determined.

In some examples, the macro signal 300 is too weak for the receiver 202 to decode the sync message. In such situations, the receiver 202 exploits one or more timing patterns in the macro signal 300 to retrieve absolute time with the help of the server 201.

The server 201 returns the UTC time in response to a request from an access point 202. In some examples, the network server automatically transmits the UTC time at the beginning of every control channel cycle, i.e., every 400 ms, to all access points 202. In some examples, the access points 202 sends a request to the network server 201 for the UTC time on detecting a boundary 320 of the synchronous capsule 316 which is substantially close to the beginning of a control channel cycle 304. In some examples, for accurate operation, the backhaul delay between an access point 202 and the server 201 must not exceed the duration of a control channel cycle, e.g., 400 ms.

In some examples, if the access point 202 is within range of the macro signals 300 from a predetermined number of distinct macro base transceiver stations 108, corresponding to the smallest and largest possible values for the synchronous capsule slot offsets 324a-d, then further processing is not needed.

In these situations, the start time of the current control channel cycle 304 is known from the position of the synchronous capsule slots 324a-d with smallest offset. Accordingly, the access point 202 only needs to request a start time for the current control channel cycle 304 from the server 201.

However, if the predetermined number of distinct macro signals 300 are unavailable, the access point 202 will need to take the assistance of the network server database 209 in the server 203 as described in further detail below.

The access point 202 then measures the offset between the boundary of the synchronous capsule and the boundary of the PN short code, S. (Step 512) In some examples, the interference from strong macro signals while detecting the boundary 320 of the synchronous capsule 316 in a weak macro signal 300 cannot be cancelled. However, in these situations, only one synchronous capsule 316 in a weak macro signal 300 needs to be detected. As such, the effect of the interference is minimal.

The access point 202 then sends the carrier frequency of a macro signal, e.g. macro signal 300 corresponding to sector 102a, and the offset S corresponding to the distance between the boundary 320 of the synchronous capsule 316 and the boundary 328 of the macro signal frame 308 to the server 203. (Step 516) In some examples, the access point 202 sends several such offsets, corresponding to different macro signals to the server 203.

In some examples, the access point 202 also sends a "PN offset delta" that is the difference, expressed as a multiple of 64 chips, between a boundary 404 of the PN short code 400 of a first sector 102a of the cell 102 and a boundary of a PN short code of a second sector 102b of the cell 102, as well as their carrier frequencies, to the server 203. Accordingly, the first sector 102a is designated a reference sector and a subsequently acquired sector, e.g., the second sector 102b, is designated a current sector. The second sector 102b can also transmit 1xRTT signals as it uses a PN short code 400 that is compatible with that of the 1x EV-DO protocol.

The database 209 includes information about all the sectors 102a and/or macro base transceiver stations 108. In some implementations, the database 209 is also configured to store location information of the access point 202. For example, the database 209 is configured to store a street address, a zip code or, in some situations, latitude and longitude information. In some implementations, the location information is provided by a service manager, or the access point 202 itself.

At the server 203, at least one of the carrier frequency, the offset and the PN offset delta for each received macro signal 300 is matched with the network server database 209. (Step 520) The server 203 then returns information based on the frequency, offset and PN offset delta for each macro signal 300. For example, the server 203 returns the UTC time for the synchronous capsule 316 belonging to the macro signal 300 corresponding to at least one sector 102a within range of the access point 202, as well as a synchronous capsule slot offset, e.g., one of slot offsets 324a-d, to the access point 202. (Step 524)

In some examples, the server 203 returns the UTC time at the beginning of the PN short code 400 for the macro signal 300 corresponding to at least one sector 102a within range of the access point 202, as well as a PN offset 412 used by the sector 102a. The server 203 also returns the synchronous capsule slot offset 324a-d for at least one macro signal, e.g., macro signal 300. Accordingly, the information from the server 203 allows the access point 202 to achieve absolute time synchronization.

In some examples, the access point 202 receives macro signals 300 from macro base transceiver stations 108 corresponding to three sectors 102a. As shown in Table 1, the access point 202 acquires three distinct macro signals 300, e.g., entries 1, 2 and 3 (column 1), having frequencies F1, F2, and F2, respectively (column 2).

TABLE 1

Information received by an access point 202 in a radio access network (RAN)

| Entry (1) | Frequency (2) | S (3) | PN offset delta (4) |
|---|---|---|---|
| 1 | F1 | 33 | 0 |
| 2 | F2 | N/A | 11 |
| 3 | F2 | N/A | 35 |

As described above, the access point 202 determines the offset, S (column 3) between the boundary 320 of the synchronous capsule 316 and the boundary 404 of the PN short code 400, expressed as a multiple of 64 chips. In some examples, the access point 202 also determines the PN offset delta (column 4) for a sector, e.g. sector 102b, by computing the distance between the boundary 404 of the PN short code 400 corresponding to sector 102b and the boundary 404 of the PN short code 400 corresponding to the first sector, e.g., 102a, which is used as a reference sector.

The database 209 in the server 203 includes information for all the sectors, e.g., 102a-c, 104a-c and 106a-c, corresponding to the cells 102, 104 and 106, of the radio access network (RAN) 100. For example, information is stored in the database 209 as shown in Table 2. In some examples, the database 209 can also include information about the access points 202 such as rough geographical location, e.g., street name/address, zip code or latitude and longitude information.

As shown, the database 209 includes a sector number or ID (column 1), a carrier frequency of the macro base transceiver station 108 corresponding to the sector 102 (column 2), the PN offset 412 (column 3), the synchronous capsule slot offset 324a-d (column 4) and the offset, S (column 5) between the boundary 320 of the synchronous capsule 316 and the boundary 404 of the PN short code 400, expressed in multiples of 64 chips, modulo 512, for each sector 102a.

TABLE 2

Information contained in a network server database

| Sector (1) | Frequency (2) | PN offset (3) | Slot offset (4) | S (5) |
|---|---|---|---|---|
| 1 | F1 | 45 | 3 | 461 |
| 2 | F1 | 65 | 1 | 33 |
| 3 | F1 | 68 | 2 | 4 |
| 4 | F2 | 76 | 0 | 76 |
| 5 | F2 | 98 | 1 | 66 |
| 6 | F2 | 100 | 0 | 100 |

In some implementations, the server 203 matches a value, e.g., value 33, received from an access point 202 with the entry of the offset, S (column 5) corresponding to sector 2 (column 1) in the database 209. The server 203 then returns the UTC time of a start 318 of the most recent control channel cycle 304 as well as a slot offset 324*a-d* (column 4) to the access point 202. In these implementations, there is only one match having the offset, S (column 5) being 33. In some implementations, there can be several such matches.

In some examples, an ambiguity can also be resolved by using the PN offset differences received from access point 202. Accordingly, in some implementations, the server 203 determines values for the PN offset delta (column 4) for at least three entries corresponding to distinct macro signals 300 as being 0, 11, and 35.

Referring once again to Table 2, the difference between the PN offset for sector 1, at frequency, F1, and the PN offsets for sectors 4, 5, and 6, at frequency, F2, are 31, 53 and 55. Also, the difference between the PN offset for sector 2, at frequency, F2, and the PN offsets for sectors 4, 5, and 6, at frequency, F2 are 11, 33 and 35, respectively.

As a result, the server 203 successfully matches the PN offset delta determined by the access point 202, as shown in Table 1, with the difference between the PN offset for sector 2 and the PN offsets for sectors 4, 5 and 6, respectively. In such situations, the server 203 matches entry 1 (of Table 1) with sector 2 (of Table 2), entry 2 with sector 4 and entry 3 with sector 6. Subsequently, the server 203 returns the UTC time of a start 318 of the most recent control channel cycle 304 as well as the slot offset, i.e., one, of sector 2 (the first macro signal acquired by the receiver 202, to the access point 202.

In some examples, the value of the offset, S is used to directly identify possible reference sectors as described in the first set of examples, and the PN offset matching technique described in the second set of examples is used to identify a correct reference sector. If a predetermined number of PN offset deltas is measured and communicated to the server 203 to uniquely identify a reference sector and if the backhaul delay does not exceed the duration of a short PN code 400, then there is typically no need to identify a boundary 320 of a synchronous capsule 316 and transmit the offset, S to the server 203. The server 203 returns the UTC time of the latest boundary 404 of the short PN code 400 of the reference sector, as well as its PN offset 412.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. For example, the techniques described herein can be performed in a different order and still achieve desirable results.

What is claimed is:

1. A method comprising:
    receiving, at an access point, a macro signal from a macro base transceiver station;
    determining, based on the macro signal, an offset between (a) a boundary of a synchronous capsule in a control channel cycle occurring at the access point and (b) a boundary of a periodic pseudo-noise sequence;
    transmitting the determined offset to a server;
    receiving, from the server, information comprising at least one of a UTC time at a beginning of the control channel cycle or the synchronous capsule offset; and
    synchronizing the access point to an absolute time based on the information.

2. The method of claim 1 also comprising synchronizing the access point to the periodic pseudo-noise sequence.

3. The method of claim 1 in which a beginning of the periodic pseudo-noise sequence immediately precedes the boundary of the synchronous capsule.

4. The method of claim 1 also comprising transmitting, to the server, a carrier frequency corresponding to each macro signal received by the access point.

5. The method of claim 1 also comprising transmitting to the server a difference between a first boundary of a PN short code of a current sector and a second boundary of a PN short code of a reference sector.

6. The method of claim 1 also comprising transmitting to the server a first carrier frequency corresponding to a current sector and a second carrier frequency corresponding to a reference sector.

7. The method of claim 1 in which the control channel cycle is a current control channel cycle.

8. The method of claim 1 in which the server is configured to store location information for the access point.

9. The method of claim 8 in which location information comprises at least one of a street address, a zip code, a latitude and a longitude.

10. The method of claim 1 also comprising identifying the boundary of the synchronous capsule by detecting a preamble of the synchronous capsule.

11. A method comprising:
receiving, at an access point, from a server, a UTC time corresponding to a beginning of a control channel cycle, and
synchronizing the access point to the UTC time, when at least a predetermined number of sectors, each having a unique synchronous capsule offset, is acquired by the access point, wherein receiving the UTC time corresponding to the beginning of the control channel cycle is in response to detection of a offset of a boundary of a synchronous capsule.

12. The method of claim 11 in which the predetermined number of sectors acquired by the access point is at least two.

13. A method comprising:
synchronizing an access point to a periodic pseudo-noise sequence in a macro signal,
determining, based on the macro signal, information comprising at least (a) a boundary of a synchronous capsule in a control channel cycle occurring at the access point and (b) a beginning of the periodic pseudo-noise sequence that immediately precedes the boundary of the synchronous capsule;
transmitting the determined information to a server;
receiving, from the server, a UTC time at the boundary of the synchronous capsule at the beginning of the periodic pseudo-noise sequence; and
establishing absolute time synchronization based on the received UTC time.

14. The method of claim 13 in which synchronizing the access point to the periodic pseudo-noise sequence comprises detecting a pilot signal burst in at least one frame of the current control channel cycle.

15. A method comprising:
receiving, at a server, a difference between a first boundary of a first PN short code corresponding to a current sector and a second boundary of a second PN short code corresponding to a reference sector,
determining information corresponding to the current sector based on the difference, the information comprising a slot offset between a boundary of a frame and a boundary of a synchronous capsule, the information further comprising a UTC time, and
transmitting the information corresponding to the current sector to an access point.

16. The method of claim 15 also comprising receiving carrier frequencies of a plurality of macro signals acquired by the access point.

17. The method of claim 15 in which the UTC time comprises a UTC time of the synchronous capsule for the current sector.

18. The method of claim 15 in which the UTC time comprises a UTC time at a beginning of a periodic pseudo-noise sequence for the reference sector.

19. The method of claim 15 in which determining information corresponding to the current sector is also based on location information of each access point.

20. The method of claim 19 in which the location information is at least one of a street address, a zip code, a latitude and a longitude.

21. An apparatus comprising:
an access point configured to:
receive a macro signal from a macro base transceiver station;
determine, based on the macro signal, an offset between (a) a boundary of a synchronous capsule in a current control channel cycle occurring at the access point and (b) a beginning of a periodic pseudo-noise sequence;
transmit the determined offset to a server;
receive, from the server, information comprising at least one of a UTC time at a beginning of the control channel cycle or the synchronous capsule offset; and
synchronize the access point to an absolute time based on the information.

22. The apparatus of claim 21 in which the access point is configured to also synchronize the access point to the periodic pseudo-noise sequence.

23. The apparatus of claim 21 in which the beginning of the periodic pseudo-noise sequence immediately precedes the boundary of the synchronous capsule.

24. The apparatus of claim 21 in which the access point is configured to also transmit, to the server, a carrier frequency corresponding to each macro signal received by the access point.

25. The apparatus of claim 21 in which the access point is configured to also transmit, to the server, a difference between a first boundary of a PN short code of a current sector and a second boundary of a PN short code of a reference sector.

26. The apparatus of claim 21 in which the control channel cycle is a current control channel cycle.

27. The apparatus of claim 25 in which the server is configured to store location information for each access point.

28. The apparatus of claim 27 in which the location information comprises at least one of a street address, a zip code, a latitude and a longitude.

29. The apparatus of claim 21 in which the access point is also configured to identify the boundary of the synchronous capsule by detecting a preamble of the synchronous capsule.

30. An apparatus comprising:
a server configured to:
receive a difference between a first boundary of a first PN short code corresponding to a current sector and a second boundary of a second PN short code corresponding to a reference sector,
determine information corresponding to the current sector based on the difference, the information comprising a slot offset between a boundary of a frame and a boundary of a synchronous capsule, the information further comprising a UTC time, and
transmit the information corresponding to the current sector to an access point.

31. The apparatus of claim 30 in which the server is configured to also receive a carrier frequency corresponding to each macro signal acquired by the access point.

32. The apparatus of claim 30 in which the UTC time comprises a UTC time of the synchronous capsule for the current sector.

33. The apparatus of claim 30 in which the UTC time comprises a UTC time at a beginning of a periodic pseudo-noise sequence for the reference sector.

34. The apparatus of claim 30 in which the server is configured to determine information corresponding to the current sector based also on location information of each access point.

35. The apparatus of claim 34 in which the location information is at least one of a street address, a zip code, a latitude and a longitude.

36. A non-transitory computer readable medium comprising instructions to cause an access point to:
receive a macro signal from a macro base transceiver station;
determine, based on the macro signal, an offset between (a) a boundary of a synchronous capsule in a current control channel cycle occurring at the access point and (b) a beginning of a periodic pseudo-noise sequence;
transmit the determined offset to a server;
receive, from the server, information comprising at least one of a UTC time at a beginning of the control channel cycle or the synchronous capsule offset; and
establish absolute time synchronization based on the information.

37. The non-transitory computer readable medium of claim 36 comprising instructions to also cause the access point to synchronize to the periodic pseudo-noise sequence.

38. The non-transitory computer readable medium of claim 36 comprising instructions in which the beginning the periodic pseudo-noise sequence immediately precedes the boundary of the synchronous capsule.

39. The non-transitory computer readable medium of claim 36 comprising instructions to also cause the access point to also transmit, to the server, a carrier frequency corresponding to each macro signal received by the access point.

40. The non-transitory computer readable medium of claim 36 comprising instructions to also cause the access point to also transmit, to the server, a difference between a first boundary of a PN short code of a current sector and a second boundary of a PN short code of a reference sector.

41. The non-transitory computer readable medium of claim 36 comprising instructions to cause the access point to identify the boundary of the synchronous capsule by detecting a preamble of the synchronous capsule.

42. A non-transitory computer readable medium comprising instructions to cause a server to:
receive a difference between a first boundary of a first PN short code corresponding to a current sector and a second boundary of a second PN short code corresponding to a reference sector,
determine information corresponding to the current sector based on the difference, the information comprising a slot offset between a boundary of a frame and a boundary of a synchronous capsule, the information further comprising a UTC time, and
transmit the information corresponding to the current sector to an access point.

43. The non-transitory computer readable medium of claim 42 comprising instructions to also cause a server to also receive a carrier frequency corresponding to each macro signal acquired by the access point.

44. The non-transitory computer readable medium of claim 42 comprising instructions in which the UTC time comprises a UTC time of the synchronous capsule for the current sector.

45. The non-transitory computer readable medium of claim 42 comprising instructions in which the UTC time comprises a UTC time at a beginning of a periodic pseudo-noise sequence for the reference sector.

46. The non-transitory computer readable medium of claim 42 comprising instructions to cause the server to determine information corresponding to the current sector based also on location information of the access point.

47. The non-transitory computer readable medium of claim 46 comprising instructions in which the location information is at least one of a street address, a zip code, a latitude and a longitude.

48. A method comprising:
determining an offset between a first timing boundary and a second timing boundary;
transmitting the offset to a server;
receiving from the server, information that is based on the offset between a first timing boundary and a second timing boundary, the information comprising a UTC time, and
synchronizing an access point to an absolute time based on the information, wherein the first timing boundary is a boundary of at least one of a frame, a periodic pseudo-noise sequence, a control channel cycle and a synchronous capsule occurring in a macro signal.

49. The method of claim 48 in which the first timing boundary is in a first macro signal and the second timing boundary is in a second macro signal.

50. A non-transitory computer readable medium comprising instructions to cause one or more processing devices to:
synchronize an access point to a periodic pseudo-noise sequence in a macro signal,
determine, based on the macro signal, information comprising at least (a) a boundary of a synchronous capsule in a control channel cycle occurring at the access point and (b) a beginning of the periodic pseudo-noise sequence that immediately precedes the boundary of the synchronous capsule;
transmit the determined information to a server;
receive, from the server, a UTC time at the boundary of the synchronous capsule at the beginning of the periodic pseudo-noise sequence; and
establish absolute time synchronization based on the received UTC time.

51. The non-transitory computer readable medium of claim 50 in which synchronizing the access point to the periodic pseudo-noise sequence comprises detecting a pilot signal burst in at least one frame of the current control channel cycle.

52. A system comprising:
one or more processing devices to:
synchronize an access point to a periodic pseudo-noise sequence in a macro signal,
determine, based on the macro signal, information comprising at least (a) a boundary of a synchronous capsule in a control channel cycle occurring at the access point and (b) a beginning of the periodic pseudo-noise sequence that immediately precedes the boundary of the synchronous capsule;
transmit the determined information to a server;
receive, from the server, a UTC time at the boundary of the synchronous capsule at the beginning of the periodic pseudo-noise sequence; and
establish absolute time synchronization based on the received UTC time.

53. The system of claim 52 in which synchronizing the access point to the periodic pseudo-noise sequence comprises detecting a pilot signal burst in at least one frame of the current control channel cycle.

54. A non-transitory computer readable medium comprising instructions to cause one or more processing devices to:
determine an offset between a first timing boundary and a second timing boundary;

transmit the offset to a server;

receive from the server, information that is based on the offset between a first timing boundary and a second timing boundary, the information comprising a UTC time, and synchronize an access point to an absolute time based on the information, wherein the first timing boundary is a boundary of at least one of a frame, a periodic pseudo-noise sequence, a control channel cycle, and a synchronous capsule occurring in a macro signal.

55. The non-transitory computer readable medium of claim 53 in which the first timing boundary is in a first macro signal and the second timing boundary is in a second macro signal.

56. A system comprising:

one or more processing devices to:

determine an offset between a first timing boundary and a second timing boundary;

transmit the offset to a server;

receive from the server, information that is based on the offset between a first timing boundary and a second timing boundary, the information comprising a UTC time, and synchronize an access point to an absolute time based on the information, wherein the first timing boundary is a boundary of at least one of a frame, a periodic pseudo-noise sequence, a control channel cycle, and a synchronous capsule occurring in a macro signal.

57. The system of claim 56 in which the first timing boundary is in a first macro signal and the second timing boundary is in a second macro signal.

* * * * *

UNITED STATES PATENT AND TRADEMARK OFFICE
CERTIFICATE OF CORRECTION

PATENT NO. : 8,520,659 B2
APPLICATION NO. : 11/958975
DATED : August 27, 2013
INVENTOR(S) : Pierre A. Humblet It is certified that error appears in the above-identified patent and that said Letters Patent is hereby corrected as shown below:

In the Claims

Column 12, Line 47, In Claim 1, delete "the" and insert -- a --, therefor.

Column 12, Line 47, In Claim 1, after "capsule" insert -- slot --, therefor.

Column 13, Line 13, In Claim 11, delete "time," and insert -- time --, therefor.

Column 13, Line 18, In Claim 11, delete "a offset" and insert -- an offset --, therefor.

Column 13, Line 64, In Claim 19, delete "each" and insert -- the --, therefor.

Column 14, Line 14 (approx.), In Claim 21, delete "the" and insert -- a --, therefor.

Column 14, Line 14 (approx.), In Claim 21, after "capsule" insert -- slot --, therefor.

Column 14, Line 66, In Claim 34, delete "each" and insert -- the --, therefor.

Column 15, Line 16 (approx.), In Claim 36, delete "the" and insert -- a --, therefor.

Column 15, Line 16 (approx.), In Claim 36, after "capsule" insert -- slot --, therefor.

Column 16, Line 17 (approx.), In Claim 48, delete "cycle" and insert -- cycle, --, therefor.

Column 17, Lines 11-12, In Claim 55, delete "claim 53" and insert -- claim 54 --, therefor.

Signed and Sealed this
Seventh Day of October, 2014

Michelle K. Lee
*Deputy Director of the United States Patent and Trademark Office*